United States Patent
Durairaj et al.

(10) Patent No.: US 7,589,164 B2
(45) Date of Patent: Sep. 15, 2009

(54) FLEXIBILIZED RESORCINOLIC NOVOLAK RESINS AND METHOD OF MAKING SAME

(76) Inventors: Raj B. Durairaj, 123 Edgemeade Dr., Monroeville, PA (US) 15146; Mark A. Lawrence, 5118 Scenic Rd., Murrysville, PA (US) 15668

( * ) Notice: Subject to any disclaimer, the term of this patent is extended or adjusted under 35 U.S.C. 154(b) by 136 days.

(21) Appl. No.: 11/567,210

(22) Filed: Dec. 6, 2006

(65) Prior Publication Data

US 2007/0093596 A1 Apr. 26, 2007

Related U.S. Application Data

(63) Continuation of application No. 10/734,521, filed on Dec. 12, 2003, now Pat. No. 7,196,156.

(60) Provisional application No. 60/433,307, filed on Dec. 13, 2002.

(51) Int. Cl.
*C08G 14/04* (2006.01)
*C08G 8/28* (2006.01)
*C08F 283/08* (2006.01)

(52) U.S. Cl. ............... 528/129; 528/104; 528/137; 528/144; 528/154; 528/245; 528/486; 528/44; 525/413; 525/480; 525/488; 525/489; 525/534

(58) Field of Classification Search ............ 528/129, 528/104, 137, 144, 154, 245, 486; 525/413, 525/480, 488, 489, 534
See application file for complete search history.

(56) References Cited

U.S. PATENT DOCUMENTS

| 2,748,049 A | 5/1956 | Kalafus |
|---|---|---|
| 3,644,268 A | 2/1972 | Morita |
| 3,835,082 A | 9/1974 | Wright |
| 3,885,067 A | 5/1975 | Ishida et al. |
| 3,909,495 A | 9/1975 | Freitag et al. |
| 3,951,723 A | 4/1976 | Wright |
| 4,089,902 A | 5/1978 | Morita |
| 4,374,962 A | 2/1983 | Yotsumoto et al. |
| 4,376,854 A | 3/1983 | Yamaguchi et al. |
| 4,378,453 A | 3/1983 | Yotsumoto et al. |
| 5,354,788 A | 10/1994 | Johnson et al. |
| 5,700,587 A | 12/1997 | Shiau et al. |

FOREIGN PATENT DOCUMENTS

| GB | 747093 A1 | 3/1956 |
|---|---|---|
| GB | 941384 | 11/1963 |
| GB | 1079909 | 8/1967 |
| JP | 04363240 | 12/1992 |
| JP | 06299134 | 10/1994 |

OTHER PUBLICATIONS

International Search Report of PCT/US03/39839, mailed on May 3, 2004.
PCT Notification of Transmittal of the International Preliminary Report of PCT/US03/39839, mailed on Feb. 16, 2005.

*Primary Examiner*—Duc Truong

(57) ABSTRACT

A flexibilized resorcinolic novolak resin is prepared by reacting a phenolic compound, such as resorcinol, with an unsaturated dihydroxy, an unsaturated aldehyde, an aliphatic dialdehyde, or a mixture thereof. An aldehyde (different from the unsaturated aldehyde and the aliphatic dialdehyde) is either simultaneously or subsequently added to the reaction mixture. The flexibilized resorcinolic novolak resin can be used in an adhesive composition for enhancing the adhesion between tire cords and rubber for tire applications.

11 Claims, No Drawings

FLEXIBILIZED RESORCINOLIC NOVOLAK RESINS AND METHOD OF MAKING SAME

PRIOR RELATED APPLICATIONS

This patent application is a continuation application of U.S. patent application Ser. No. 10/734,521, filed on Dec. 12, 2003, now U.S. Pat. No. 7,196,156 which claims priority to U.S. Provisional Patent Application No. 60/433,307, filed on Dec. 13, 2002, both of which are incorporated herein by reference in their entirety.

FEDERALLY SPONSORED RESEARCH STATEMENT

Not applicable.

REFERENCE TO MICROFICHE APPENDIX

Not applicable.

FIELD OF THE INVENTION

The invention relates to the method of making a resorcinolic novolak type resin solutions. The resin solutions can be used in single step adhesive dip formulations to improve the adhesion between the synthetic fibers, particularly polyester fibers or cords, to rubber compounds.

BACKGROUND OF THE INVENTION

Rubber articles designed to withstand considerable stresses in use are reinforced with plies of comparatively inextensible textile materials. The rubber hose, belts and tires are commonly reinforced with filamentary textiles in the form of yarns, cords or fabric. In the articles, it is desirable that the plies of textile reinforcing material be firmly adhered to the rubber between the textile plies and remain effectively adhered even after the article has been subjected to repeated varying strains in use. Any separation and relative movement of the rubber and textile parts lead to abrasion between these parts and result in failure.

The majority of rubber articles in which high tensile strength is required are reinforced with textile materials such as rayon, nylon, aramid and polyester fibers. Polyester fibers, based on poly(ethylene terephthalate), namely (PET), have superior physical and chemical properties and are also produced in large quantities. Polyester's high modulus and low elongation, particularly in the tire application, reduce tire deformation and lead to better high speed performance and tread wear, reduced stress cracking and better steering characteristics.

Polyester is a very ideal material for use as the reinforcing material in the manufacture of various rubber articles including the tire. But it is relatively difficult to achieve a good bond between polyester and rubber. The poor bondability of polyester with rubber is attributed to the hydrophobic nature of fiber surface due to the limited number of polar or active hydrogen bonding groups, such as the hydroxyl (—OH) and carboxyl (—COOH), at the end of polyester molecule. Consequently, when a simple adhesives composition is applied to polyester surfaces to improve the bond with rubber, the results are poor due to poor compatibility. Molecular inter-diffusion between the adhesive and substrate (namely the fiber or rubber) is an important factor in the adhesion development of polyester material. Diffusion and subsequent interaction are much more favored when the adhesive and substrate are thermodynamically compatible.

Even though the resorcinol or resorcinol-formaldehyde (R/F) based adhesive formulations are now used for improving the bonding performance of various synthetic fiber materials to rubber compounds, constant adhesion improvements needed in these materials for various high performance applications require higher performance resorcinolic products for use. This is particularly true for providing a resorcinolic novolak resin solution for an application of the most difficult adhesion enhancement between the polyester fibers and rubber compounds. Therefore, there is a need for a flexibilized resorcinolic novolak resins that are useful in the adhesive formulations development for improving or enhancing the polyester tire cords adhesion towards the rubber compounds used by the tire industry.

SUMMARY OF THE INVENTION

Embodiments of the invention meet the above need in one or more of the following aspects. In one aspect, the invention relates to an adhesive composition made from a flexibilized resorcinolic resin for polyester fiber materials. The flexibilized resorcinolic resin can be made by a method which comprises (a) contacting one or more phenolic compounds with (i) an unsaturated dihydroxy compound, (ii) an unsaturated aliphatic aldehyde compound, (iii) an aliphatic dialdehyde compound, (iv) or a mixture thereof in the presence of an acid catalyst to obtain a reaction mixture; (b) contacting the reaction mixture with an aldehyde which is different from the unsaturated aldehyde and the aliphatic dialdehyde.

In some embodiments, the flexibilized resorcinolic resin is prepared by reacting (a) one or more compounds represented by a general formula (A)

where $R_1$ represents a radical selected from the group consisting of hydrogen, hydroxyl or an alkyl radical having 1 to 3 carbon atoms, with (b) an unsaturated dihydroxy aliphatic compound, such as 1,4-dihydroxy-2-butene, to obtain a mixture of reaction products comprising one or more compounds represented by the following general structures.

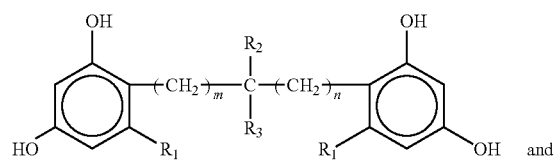

and

-continued

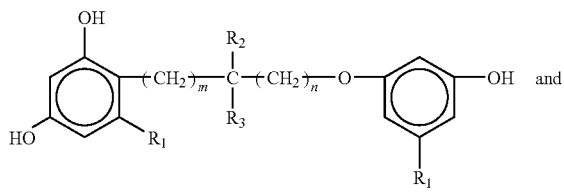
(C)

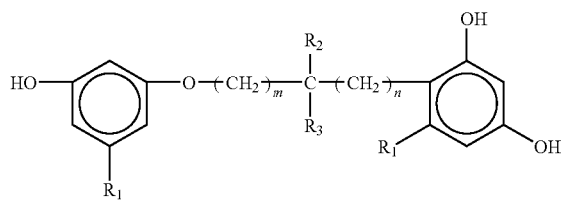
(D)

where $R_1$ and $R_2$ are independently —$CH_3$, —$CH_2CH_3$, or —$CH_2CH_2CH_3$;

and $R_3$ is either —H or

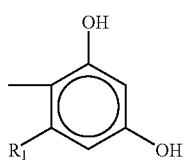

and m=0, 1 or 2 and n=0, 1 or 2.

and then (c) reacting with an aldehyde, such as formaldehyde, acetaldehyde, propionaldehyde, butyraldehyde and iso-butyraldehyde, to obtain a flexible novolak type resin.

In other embodiments, the flexibilized resorcinolic resin is prepared by reacting (a) one or more compounds represented by a general formula (A)

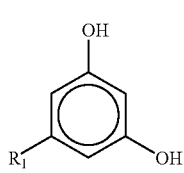
(A)

where $R_1$ represents a radical selected from the group consisting of hydrogen, hydroxyl or an alkyl radical having 1 to 3 carbon atoms, with (b) an unsaturated aliphatic aldehyde, such as crotonaldehyde, acrolein, or methacrolein, to obtain a mixture of reaction products comprising alkylene bridged phenols having the general formula (E).

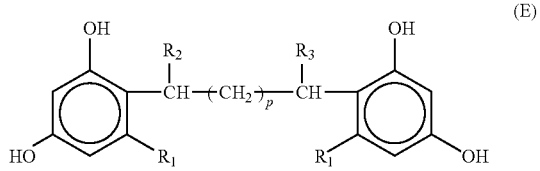
(E)

where $R_1$ and $R_2$ are as defined before and $R_3$ is

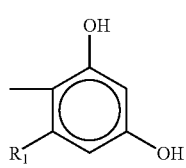

and p=0 or 1.

and then (c) reacting with an aldehyde, such as formaldehyde, acetaldehyde, propionaldehyde, butyraldehyde or iso-butyraldehyde, to obtain a flexible novolak type resin.

In still other embodiments, the flexibilized resorcinolic resin is prepared by reacting (a) one or more compounds represented by a general formula (A)

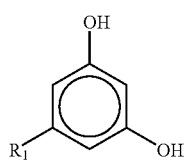
(A)

where $R_1$ represents a radical selected from the group consisting of hydrogen, hydroxyl or an alkyl radical having 1 to 3 carbon atoms, with (b) an aliphatic dialdehyde compound, such as malonaldehyde, succinaldehyde, glutaraldehyde and adipaldehyde, to obtain a of reaction product comprising alkylene bridged phenols having the general formula (F);

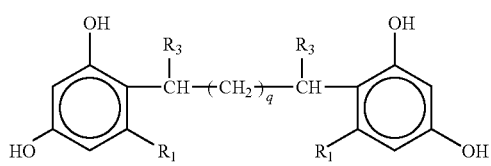
(F)

where $R_3$ is

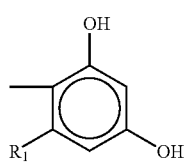

and q=1, 2, 3 or 4.

and then (c) reacting with an aldehyde, such as formaldehyde, acetaldehyde, propionaldehyde, butyraldehyde and iso-butyraldehyde, to obtain a flexible novolak type resin.

In another aspect, the invention relates to a one-step dip adhesive composition for bonding polyester and other synthetic fibers to rubber compounds. The one-step dip adhesive composition comprises an aqueous mixture of: (1) a flexibilized resorcinol based novolak type resin described herein; (2) an aqueous formaldehyde solution; (3) a vinyl pyridine SBR type latex; (4) a sodium hydroxide solution to adjust the pH of the solution between about 6 to about 12; (5) sufficient water to adjust the solids content of the formulation between about 10% to about 40 weight %; and (6) optionally, any compound that enhances the adhesion still further, at least one or more of an adhesion promoter additive compound selected from the group consisting of blocked diisocyanates, aliphatic water soluble or dispersible epoxy compounds and organosilanes.

In still another aspect, the invention relates to a process for adhering the polyester fibers or cords to rubber compounds. The process comprises (a) preparing an one step aqueous dip formulation comprising the flexibilized resorcinolic resin described herein, formaldehyde solution, a latex solution, water and sodium hydroxide solution; (b) dipping or treating the fibers or cords in the aqueous dip solution; (c) drying the dipped or treated fibers or cords, preferably at a temperature of 170° C. for about 120 seconds; (d) curing the dried fibers, preferably at temperature of 230° C. for about 60 seconds; (d) embedding in a formulated and uncured rubber compound; and then (e) curing or vulcanizing the rubber compound for a sufficient time and pressure to promote good adhesion between the polyester fibers and cured rubber.

Other aspects of the invention relate to the flexibilized resorcinolic resin, methods of making the resin, and uses of the resin which are described in the following. Additional aspects of the invention, advantages and characteristics provided by various embodiments of the invention are apparent to those skilled in the art with the following description.

DESCRIPTION OF EMBODIMENTS OF THE INVENTION

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

In accordance with some embodiments of the invention, a flexibilized resorcinolic resin useful in adhesive formulations to improve the adhesion of synthetic organic filamentary materials, such as nylon, aramid and polyesters, to rubber compounds, is made by a method which comprises (a) contacting one or more phenolic compounds with (i) an unsaturated dihydroxy compound, (ii) an unsaturated aliphatic aldehyde compound, (iii) an aliphatic dialdehyde compound, (iv) or a mixture thereof in the presence of an acid catalyst to obtain a reaction mixture; (b) contacting the reaction mixture with an aldehyde which is different from the unsaturated aldehyde and the aliphatic dialdehyde.

The phenolic compounds suitable for the novolak resins are meta-substituted phenols such as the m-cresol, resorcinol, phloroglucinol and their derivatives. When using the resorcinol derivatives, it is preferred to use the derivatives containing alkyl side chains of 1 to 3 carbon atoms to retain water solubility or dispersability. Suitable phenolic compounds for the resin preparation can be selected from m-cresol, 3,5-dimethyl phenol, resorcinol, 5-methyl resorcinol, 5-ethyl resorcinol, 5-propyl resorcinol, m-amino phenol, 2-methyl resorcinol, 4-methyl resorcinol, 4-ethyl resorcinol, 4-propyl resorcinol and phloroglucinol. Resorcinol is a preferred phenolic compound due to its commercial availability and low cost compared to other derivatives.

Suitable unsaturated dihydroxy compounds are generally represented by the following formula:

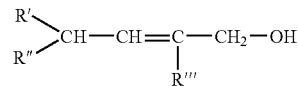

where R', R", and R'" are individually a hydrogen or hydrocarbyl group, provided that R' and R" cannot both be hydrogen at the same time, and that one of R' and R" is or includes an —OH group. The hydrocarbyl group preferably is an aliphatic straight or branched alkyl. R', R", and R'" individually can be —H, —CH$_3$, —C$_2$H$_5$, —C$_3$H$_7$, —C$_4$H$_9$, —C$_5$H$_{11}$, —C$_6$H$_{13}$, —OH, —CH$_2$OH, —CH$_3$CH$_2$OH. Preferably, R' and R'" are hydrogen, and R" is an alkyl of C$_1$ to C$_5$ in which one hydrogen is substituted by an —OH group. Alternatively, R' is OH, R'" is —H, and R" is a straight or branched C$_1$-C$_5$ alkyl. A preferred aliphatic unsaturated dihydroxy compound is 1,4-dihydroxy-2-butene. Others may include, but not limited to, 1,4-dihydroxy-2-pentene, 1,4-dihydroxy-2-hexene, 1,4-dihydroxy-2-heptene, 1,4-dihydroxy-2-octene, 1,5-dihydroxy-2-pentene, 1,6-dihydroxy-2-hexene, 1,7-dihydroxy-2-heptene, and 1,8-dihydroxy-2-octene.

Suitable unsaturated aliphatic aldehyde compounds are generally represented by the following formula:

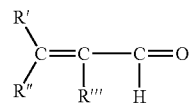

wherein R', R", and R'" are individually a hydrogen or hydrocarbyl group. The hydrocarbyl group can be straight or branched. For example, R', R", and R'" individually can be —H, —CH$_3$, —C$_2$H$_5$, —C$_3$H$_7$, —C$_4$H$_9$, —C$_5$H$_{11}$, —C$_6$H$_{13}$. Preferably, R'" is hydrogen or a straight or branched C$_1$-C$_5$ alkyl. Preferred unsaturated aliphatic aldehyde compounds include, but are not limited to, crotonaldehyde, arolein, and methacolein.

Suitable aliphatic dialdehyde compounds are generally represented by the following formula:

wherein R', R", and R'" are defined above, and n is equal to 1 or greater. Preferably, n is 1, 2, 3, 4, 5, 6, 7, 8, 9, and 10. More preferably, n is 1, 2, 3, 4, and 5. Preferred aliphatic dialdehyde compounds include, but are not limited to, malonaldehyde, succinaldehyde, glutaraldehyde, and adipaldehyde In some embodiments, the flexibilized resorcinolic resin can be made by reacting (a) one or more compounds represented by a general formula (A):

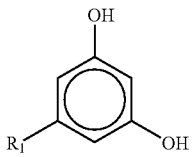
(A)

where $R_1$ represents a radical selected from the group consisting of hydrogen, hydroxyl and an alkyl radical having 1 to 3 carbon atoms, and preferably resorcinol, with (b) approximately 0.1 to 0.3 mole, per mole of phenolic compound, of an unsaturated mono or dihydroxy aliphatic compound, in the presence of (c) an acid catalyst, and (d) at a temperature of about 120 to 150° C. temperature, and (e) a reaction time of about 2 to 4 hours to complete the alcohol and phenolic reaction to obtain a mixture comprising alkylated and/or etherified phenolic type reaction products represented by the following general formulae (B, C and D)

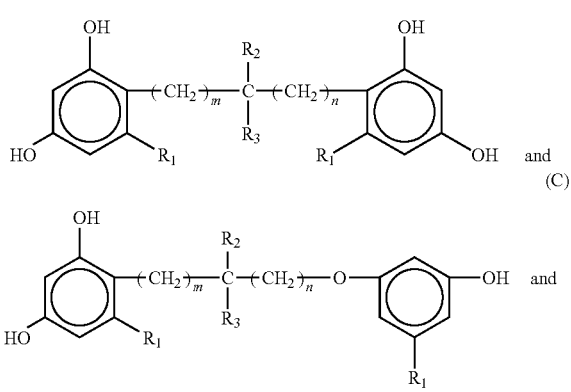
(B)
(C)
(D)

where $R_1$ and $R_2$ are independently —$CH_3$, —$CH_2CH_3$, or —$CH_2CH_2CH_3$;

and $R_3$ is either —H or

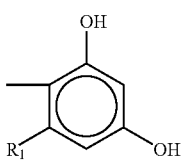

and m=0, 1 or 2 and n=0, 1 or 2.

and then reacting the resulting product with (f) about 0.35 to 0.45 mole of an aldehyde, preferably formaldehyde, per mole of phenolic compound, and (g) adjusting the pH with sodium hydroxide solution to a range from about 6 to about 12, and finally (h) adjusting the solids content with water to produce an aqueous solution containing flexible alkyl chain bridged resorcinolic novolak resins.

In other embodiments, a flexibilized alkylene chain bridged resorcinolic resin can be made by reacting (a) one or more compounds represented by a general formula (A):

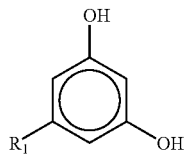
(A)

where $R_1$ represents a radical selected from the group consisting of hydrogen, hydroxyl and an alkyl radical having 1 to 3 carbon atoms, and preferably resorcinol, with (b) approximately 0.1 to 0.3 mole, per mole of phenolic compound, of an unsaturated aliphatic aldehyde compound, preferably crotonaldehyde, in the presence of (c) an acid catalyst and (d) at a temperature of about 120 to 150° C. temperature, and (e) a reaction time of about 2 to 4 hours to complete the crotonaldehyde and phenolic reaction to obtain a mixture comprising alkylated phenolic type reaction products represented by the following general formula (E)

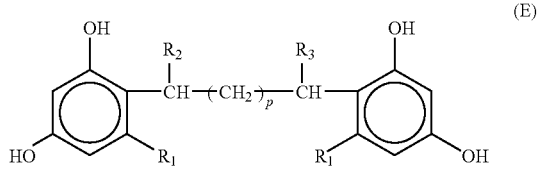
(E)

where $R_1$ and $R_2$ are as defined before and $R_3$ is

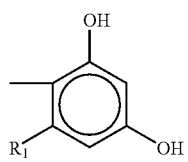

and p=0 or 1.

and then reacting the resulting product with (e) about 0.35 to 0.45 mole of an aldehyde, preferably formaldehyde, per mole of phenolic compound, and (g) adjusting the pH with sodium hydroxide solution to a range from about 6 to about 12, and finally (h) adjusting the solids content with water to produce an aqueous solution containing a flexible alkyl chain bridged resorcinolic novolak resin.

In some other embodiments, a flexibilized alkylene chain bridged resorcinolic resin that may be more compatible with polyester fiber surface for enhancing the adhesion of polyesters to rubber compounds can be prepared by the following method. First, reacting (a) one or more phenolic compounds represented by a general formula (A) with (b) approximately 0.1 to 0.2 mole, per mole of phenolic compound, of an aliphatic dialdehyde compound, preferably glutaraldehyde, in the presence of (c) an acid catalyst and (d) at a temperature of about 120° C. to 150° C. temperature, and (e) for a reaction time of about 2 to 4 hours to complete the glutaraldehyde and phenolic reaction to obtain a mixture comprising alkylated phenolic type reaction products represented by the following general formula (F)

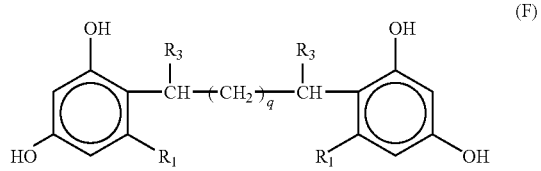

where $R_3$ is

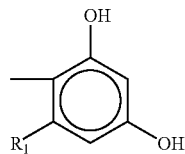

and q=2, 3 or 4.

and then reacting the resulting product with (e) about 0.35 to 0.45 mole of an aldehyde, preferably formaldehyde, per mole of phenolic compound and (g) adjusting the pH with sodium hydroxide solution to a range from about 6 to about 12, and finally (h) adjusting the solids content with water to produce an aqueous solution containing a flexible alkyl chain bridged resorcinolic novolak resin.

Generally, the reaction of an unsaturated alcohol with a resorcinol compound may be carried out in the presence of an acid catalyst at 125° C. to 150° C. temperature conditions. The reaction is done in such way that all the unsaturated alcohol is completely reacted with the phenolic compound producing a mixture comprising alkyl chain bridged resorcinols and also alkyl and alkyl ether bridged resorcinols. The formation of alkyl and alkyl ether bridged resorcinols are expected to show flexibility and lower the solubility parameter of the resulting material. When the resorcinol to dihydroxy-2-butene is 1:0.2 mole, about 10 mole percent of ether and alkyl bridged resorcinol structure is produced from the reaction. After the completion of reaction, the alkylated products from dihydroxy-2-butene contain three resoinolic groups per alkyl chain. The molar ratios of resorcinol to unsaturated alcohol can be varied between 0.1 to 0.4 mole of alcohol per mole resorcinol and preferably 0.15 to 0.25 mole of an unsaturated alcohol.

For the preparation of flexibilized resorcinolic resins using an unsaturated aldehyde, preferred compounds include, but are not limited to, crotonaldehyde, acrolein and methacrolein. They are used at a molar ratio of about 0.1 to 0.35 mole of unsaturated aldehyde per mole of resorcinol. The reaction is preferably carried out in the presence of an acid catalyst to make use of both the aldehyde and double bond in the alkylation reaction with resorcinol. The reaction products typically comprises alkyl chain bridged resorcinols containing three resorcinol groups in the molecule.

Similarly, for the preparation of a flexibilized resorcinol resin using a dialdehyde, preferred compounds are malonaldehyde, succinaldehyde, glutaraldehyde, adipaldehyde, or a mixture thereof. They are used at a molar ratio of about 0.05 to 0.15 mole of dialdehyde per mole of resorcinol. After the reaction, the alkyl chain typically contains three bridged resorcinol groups.

After the alkylation reaction, the alkylated resorcinol products are subsequently used, without isolation and containing unreacted resorcinol, to make the novolak resins by reacting with an aldehyde, preferably formaldehyde. In order to enhance the water solubility, the aldehydes containing from 1 to 6 carbon atoms are preferred that include formaldehyde, acetaldehyde, propionaldehyde, n-butyraldehyde, and n-valeraldehyde. The introduction of more alkyl groups by using these longer alkyl chain aldehydes are also expected to lower the solubility parameter close to that of polyester. In this way, the compatibility is further enhanced and therefore expected to perform better than the conventional resorcinol-formaldehyde resin for PET adhesion.

The alkylation and novolak formation reactions can be effectively carried out in the presence of an acid catalyst. Suitable catalysts used in the reactions are strong acids that are strong enough to lower the reaction mixture pH to below 1.5. Examples of this type of catalysts include, but are not limited to, oxalic acid, sulfuric acid, benzenesulfonic acid, benzenedisulfonic acid, p-toluenesulfonic acid (PTSA) and phosphoric acid. In order to obtain the complete alkylation and condensation reaction, it is preferred that the catalyst be added at beginning of these reactions.

After the flexibilized novolak resin formation is complete, the resin solution is rendered alkaline for use in an adhesive dip. Sufficient caustic is added to adjust the pH to about 8.0, although the pH is not critical since a pH of 6.0 to 13.0 can be tolerated in the adhesive dip.

The flexibilized resorcinolic novolak resin solution can be used in a single dip (i.e., single step) or double dip formulations to treat the synthetic fibers used in various applications. In resorcinol-formaldehyde-latex (RFL) formulations, the resins can replace resorcinol or resorcinol-formaldehyde (R/F) resin either partially or completely. If the resin replaces partially an R/F resin in the formulation, the flexibilty of the formulation is improved due to the replacement of some of the rigid methylene bridged structures with flexible longer chain bridged resorcinol.

In the single dip method, an aqueous alkaline dip formulation is made by mixing the flexibilized resorcinolic novolak resin solution is diluted with sufficient water to reduce the concentration of resin solids to less than about 10 weight %. The pH adjustment may be made by the addition of an aqueous caustic solution. An alkaline substance, such as sodium hydroxide or ammonium hydroxide is added to the dip to adjust the pH to about 7.0 to about 12.0. After adjusting the solution pH, an aqueous formaldehyde solution is added. A synthetic rubber latex is then added to the resin solution. The dip thus prepared is ready for an immediate use, but dips usually show good results if they are aged for about 16 to 24 hours at room temperature prior to use. In the preparation of a single dip formulation, optionally an adhesion promoter may be employed. A majority of adhesion promoters incorporated in the RFL improves the bonding to polyester fiber by surface diffusion or penetration. In the case of an isocyanate and epoxy used as the adhesion promoters, the solubility parameter of the reaction products are close to that of PET and, therefore a good adhesion is obtained with this system.

The rubber latex used in the dip may be a natural rubber latex, a styrene-butadiene rubber latex, an acrylonitrile-butadiene rubber latex, a chloroprene rubber latex and a vinylpyridine-styrene-butadiene rubber latex. These lattices can be used alone or as mixtures. There is no limitation on the type of rubber latex use in the dip formulation. In general, vinylpyridine-styrene-butadiene copolymer latices are preferably used as the main rubber component of the rubber latex.

In the double dip method, the synthetic fibers are treated with the first dip solution comprising at least one adhesive compound selected from polyepoxide compounds, blocked polyisocyanate compounds or ethylene-urea compounds. The polyepoxide compound suitable for use comprises molecules containing one or more epoxy groups and includes epoxy compounds made from glycerol, pentaerythritol, sorbitol, ethylene glycol, polyethylene glycol and resorcinol. Of these compounds, the polyepoxides of polyalcohols are preferred. The blocked polyisocyanates are selected from lactams, phenols and oximes blocked isocyanates comprising toluene diisocyanate, metaphenylene diisocyanate, diphenylmethane diisocyanate, triphenylmethane triisocyanate and hexamethylene diisocyanate. This first dip treatment actually activates the fiber surface to enhance the interaction with the second dip solution primarily an RFL as the main component. The use of flexibilized resorcinolic resin solution in the RFL of double dip formulation can further improve the adhesion of synthetic fibers to rubber compounds.

The rubber reinforcing synthetic fibers, which can be used to improve their adhesive performance for various industrial applications, may be in the form of filament yarns, cords and woven fabrics comprising synthetic fibers such as polyamide fibers, polyester fibers, aromatic polyamide fibers and polyvinyl alcohol fibers and are characterized in that their surfaces have been coated with an adhesive composition for enhancing the fiber, RFL and rubber interaction.

The adhesive formulation can be used for bonding polyester tire cords, due to the increased flexibilty, lower solubility parameter for better compatibility and higher reactivity for improved performance, to rubber with improved results than the conventional formulation.

In the process for adhering polyester cords to rubber compounds, a conventional dipping machine is employed whereby the cords are continuously drawn through a dip bath containing the one step dip formulation prepared using the resin made in accordance with embodiments of the invention. The excess dip is removed by blowing the cord with air jets and then dried the cord in an oven set at 170° C. temperature for 120 seconds. Then the cords are cured at 230° C. temperature for a sufficient time necessary for the penetration of the dip into the polyester cord. An acceptable cure time of about 60 seconds has been found to be suitable.

In the process of testing the successful bonding of polyester cords to rubber, the adhesive treated cords are embedded in a formulated and uncured rubber compound and then vulcanized the rubber compound for a sufficient time and pressure to promote good adhesion. The H-adhesion test has been employed to determine the static adhesion of textile tire cords to rubber. This test is specified as ASTM D-4776 method and is used for testing purposes.

Though the adhesive containing polyester reinforcing fibers or cords can be adhered to a vulcanizable compounds of natural rubber, polybutadiene rubber and rubbery butadiene-styrene copolymer, it is understood that this polyesters can be adhered to other vulcanizable rubbery materials from the group comprising nitrile rubbers, chloroprene rubbers, polyisoprenes, acrylic rubbers, ethylene-propylene-diene monomer (EPDM) rubber and isoprene-acrylonitrile rubbers. These rubbers prior to curing can be mixed with the usual compounding ingredients comprising sulfur, stearic acid, zinc oxide, accelerators, antioxidants, antiozonants, and other curatives.

Polyester fibers, yarns, filaments, cords or fabric coated with the adhesive formulation described herein can be used in the manufacture of radial, bias, or belted-bias passenger tires, truck tires, motorcycle or bicycle tires, off-the-road tires, airplane tires, transmission belts, V-belts, conveyer belts, hose, and gaskets.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLE 1

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 35.0 grams of 1,4-dihydroxy-2-butene (0.4 mole) were added into the molten resorcinol slowly over a period of 45-90 minutes at 135-145° C. Continuously stir and hold the reaction mixture at this temperature for an additional 180-240 minutes to complete the resorcinol-dihydroxy-2-butene reaction. Now, slightly lower the reaction temperature and then add 60.5 grams of an aqueous formaldehyde solution (37.6% concentration; 0.76 mole) slowly for a period of 30-60 minutes at 90-105° C. temperature or reflux conditions. The reaction mixture was held under reflux for an additional period of 30-60 minutes. After this, 187 grams of distilled water and about 15 grams of 50% sodium hydroxide solution were added under constant stirring to obtain an aqueous dip solution. The resin solution thus prepared had a pH=7.8, solids content of 50.8 wt. % and 6.1 wt. % resorcinol present as free monomers (by GC/LC analysis). Gel Permeation Chromatographic (GPC) analysis to determine the area ratio of select resorcinol condensation products showed the reaction components comprising about 12.6% monomer (resorcinol), 14.4% dimer, 11.2% trimer, 8.7% tetramer and 53.1% pentamer and higher. The viscosity determined by the Brookfield viscometer showed a viscosity of 1100 centipoise (cps) determined at room temperature. The reaction product of resorcinol, 1,4-dihydroxy-2-butene and formaldehyde was also analyzed by FT-IR and proton/carbon-13 NMR spectroscopic methods. Analyses showed that approximately 10 mole percent of the 1,4-dihydroxy-2-butene and resorcinol reaction product present as resorcinolic ether and the remainder being alkylation products. All the —CH$_2$OH and olefinic protons were completely reacted with resorcinol.

Average structural data from NMR is shown below:

| Structure | Number Per Resorcinol Ring |
|---|---|
| Resorcinolic protons | 2.65 |
| Methylene bridges | 0.74 |
| "C$_4$H$_7$ Bridges" (Structure 1) | 0.61 |
| Resorcinolic ether bridges (Structures 2 and 3) | 0.07 |
| Formaldehyde/Resorcinol | 0.37 |
| Dihydroxy butene/Resorcinol | 0.16 |

The final reaction product showed structures comprising the following structures.

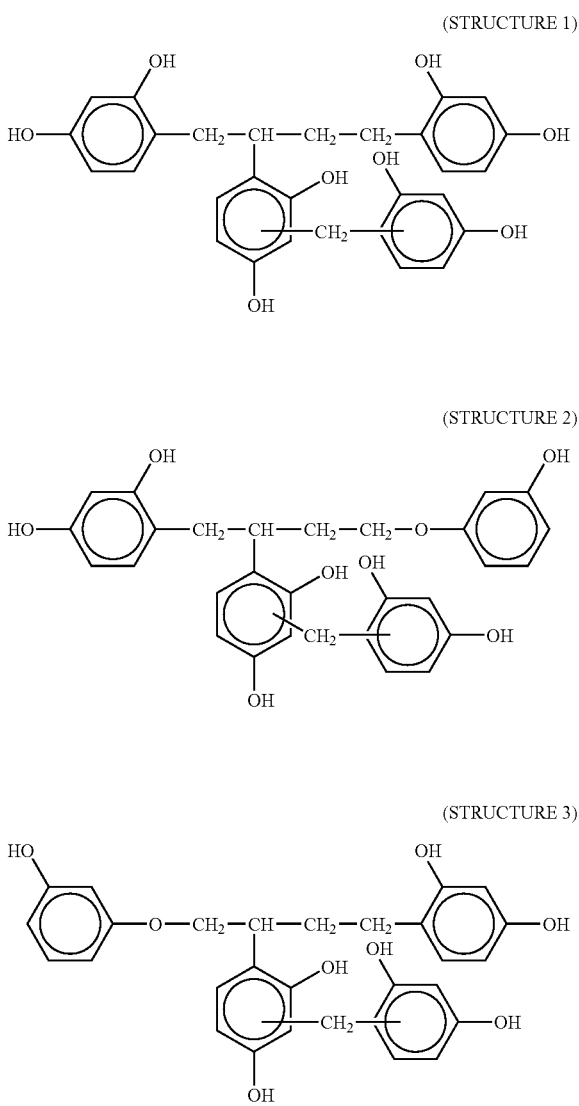

(STRUCTURE 1)

(STRUCTURE 2)

(STRUCTURE 3)

EXAMPLE 2

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 23.2 grams of allyl alcohol (0.4 mole) were added into the molten resorcinol slowly over a period of 45-90 minutes at 135-145° C. Continuously stir and hold the reaction mixture at this temperature for an additional 180-240 minutes to complete the resorcinol-allyl alcohol reaction. Now, slightly lower the reaction temperature and then add 60.5 grams of an aqueous formaldehyde solution (37.6% concentration; 0.76 mole) slowly for a period of 30-60 minutes at 90-105° C. temperature or reflux conditions. The reaction mixture was held under reflux for an additional period of 30-60 minutes. After this, 198 grams of distilled water and about 2 grams of 50% sodium hydroxide solution were added under constant stirring to obtain an aqueous dip solution. The resin solution thus prepared had a pH=5.1, solids content of 49.6 wt. % and 8.0 wt. % resorcinol present as free monomers (by GC/LC analysis). Gel Permeation Chromatographic (GPC) analysis to determine the area ratio of select resorcinol condensation products showed the reaction components comprising about 16.1% monomer (resorcinol), 19.3% dimer, 14.7% trimer, 10.9% tetramer and 38.9% pentamer and higher. The viscosity determined by the Brookfield viscometer showed a viscosity of 145 centipoise (cps) determined at room temperature. The reaction product of resorcinol, allyl alcohol and formaldehyde was also analyzed by FT-IR and proton/carbon-13 NMR spectroscopic methods. Analyses showed that approximately 20 mole percent of the allyl alcohol and resorcinol reaction product present as resorcinolic ether and the remainder being alkylation products. All the —$CH_2OH$ and olefinic protons were completely reacted with resorcinol.

Average structural data from NMR is shown below:

| Structure | Number Per Resorcinol Ring |
|---|---|
| Resorcinolic protons | 2.87 |
| Methylene bridges | 0.80 |
| "$C_3H_6$ Bridges" (Structures 4 and 5) | 0.30 |
| Resorcinolic ether bridges (Structure 6) | 0.06 |
| Formaldehyde/Resorcinol | 0.40 |
| Allyl alcohol/Resorcinol | 0.21 |

The final reaction product showed structures comprising the following structures.

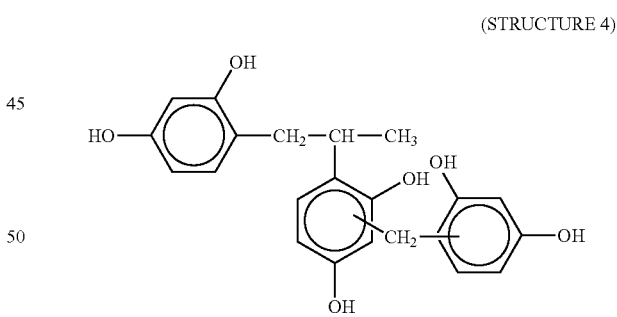

(STRUCTURE 4)

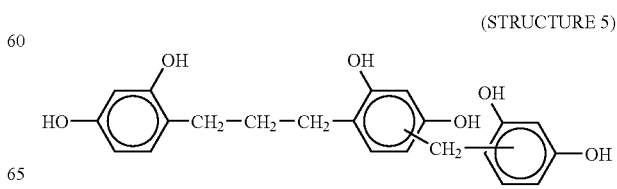

(STRUCTURE 5)

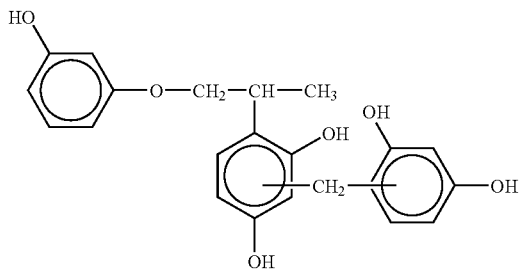

(STRUCTURE 6)

EXAMPLE 3

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 35.0 grams of crotonaldehyde (0.5 mole) were added into the molten resorcinol slowly over a period of 45-60 minutes at 120-130° C. Continuously stir and hold the reaction mixture at this temperature for an additional 120-150 minutes to complete the resorcinol-crotonaldehyde reaction. Now, slightly lower the reaction temperature and then add 55.8 grams of an aqueous formaldehyde solution (37.6% concentration; 0.70 mole) slowly for a period of 30-45 minutes at 90-105° C. temperature or reflux conditions. The reaction mixture was held under reflux for an additional period of 30-45 minutes. After this, 201.2 grams of distilled water and about 6 grams of 50% sodium hydroxide solution were added under constant stirring to obtain an aqueous dip solution. The resin solution thus prepared had a pH=6.9, solids content of 52.1 wt. % and 3.6 wt. % resorcinol present as free monomers (by GC/LC analysis). The viscosity determined by the Brookfield viscometer showed a viscosity of 21,700 centipoise (cps) determined at room temperature. The reaction product of resorcinol, crotonaldehyde and formaldehyde was also analyzed by FT-IR and proton/carbon-13 NMR spectroscopic methods. Analyses showed that the crotonaldehyde reacted with resorcinolic rings to produce a mixture of "1,1,2-triphenylbutanes" and "1,1,3-triphenylbutanes" structures. The resorcinol rings that have reacted with crotonaldehyde may have reacted with formaldehyde to form methylene bridged structures. All the —CHO and olefinic protons were completely reacted with resorcinol.

Average structural data from NMR is shown below:

| Structure | Number Per Resorcinol Ring |
|---|---|
| Resorcinolic protons | 2.53 |
| Methylene bridges | 0.64 |
| 1,1,2-Triphenylbutane links (Structure 7) | 0.48 |
| 1,1,3-Triphenylbutane links (Structure 8) | 0.35 |
| Formaldehyde/Resorcinol | 0.32 |
| Crotonaldehyde/Resorcinol | 0.28 |

The final reaction product showed structures comprising the following structures.

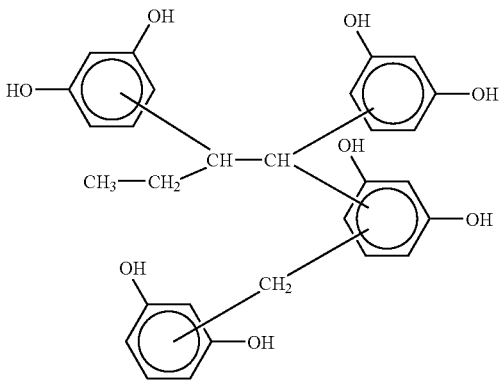

(STRUCTURE 7)

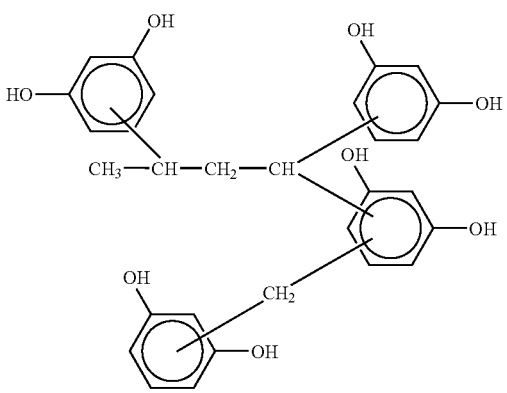

(STRUCTURE 8)

EXAMPLE 4

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 28.0 grams of crotonaldehyde (0.4 mole) were added into the molten resorcinol slowly over a period of 45-60 minutes at 120-130° C. Continuously stir and hold the reaction mixture at 100-110° C. temperature for an additional 120-150 minutes to complete the resorcinol-crotonaldehyde reaction. Now, slightly lower the reaction temperature and then add 60.6 grams of an aqueous formaldehyde solution (37.6% concentration; 0.76 mole) slowly for a period of 30-45 minutes at 90-105° C. temperature or reflux conditions. The reaction mixture was held under reflux for an additional period of 30-45 minutes. After this, 194.6 grams of distilled water and about 4 grams of 50% sodium hydroxide solution were added under constant stirring to obtain an aqueous dip solution. The resin solution thus prepared had a pH=6.4, solids content of 51.0 wt. % and 4.5 wt. % resorcinol present as free monomers (by GC/LC analysis). Gel Permeation Chromatographic (GPC) analysis to determine the area ratio of select resorcinol condensation products showed the reaction components comprising about 9.4% monomer (resorcinol), 10.5% dimer, 7.9% trimer, 6.3% tetramer and 65.9% pentamer and higher. The viscosity determined by the Brookfield viscometer showed a viscosity of 1380 centipoise (cps) determined at room temperature. The reaction product of resorcinol, crotonaldehyde and formaldehyde was also analyzed by FT-IR and proton/carbon-13 NMR spectroscopic methods. Analyses showed that the crotonaldehyde reacted with resorcinolic rings to produce a mixture of "1,1,2-triphenylbutanes" and "1,1,3-triphenylbutanes" structures. The resorcinol rings that have reacted with crotonaldehyde may have reacted with formaldehyde to form methylene bridged structures. All the —CHO and olefinic protons were completely reacted with resorcinol.

Average structural data from NMR is shown below:

| Structure | Number Per Resorcinol Ring |
| --- | --- |
| Resorcinolic protons | 2.57 |
| Methylene bridges | 0.73 |
| 1,1,2-Triphenylbutane links (Structure 7 in Example 3) | 0.42 |
| 1,1,3-Triphenylbutane links (Structure 8 in Example 3) | 0.28 |
| Formaldehyde/Resorcinol | 0.37 |
| Crotonaldehyde/Resorcinol | 0.23 |

EXAMPLE 5

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 21.0 grams of crotonaldehyde (0.3 mole) were added into the molten resorcinol slowly over a period of 45-60 minutes at 120-130° C. Continuously stir and hold the reaction mixture at 100-110° C. temperature for an additional 120-150 minutes to complete the resorcinol-crotonaldehyde reaction. Now, slightly lower the reaction temperature and then add 60.6 grams of an aqueous formaldehyde solution (37.6% concentration; 0.76 mole) slowly for a period of 30-45 minutes at 90-105° C. temperature or reflux conditions. The reaction mixture was held under reflux for an additional period of 30-45 minutes. After this, 194.6 grams of distilled water and about 2 grams of 50% sodium hydroxide solution were added under constant stirring to obtain an aqueous dip solution. The resin solution thus prepared had a pH=5.1, solids content of 50.1 wt. % and 6.4 wt. % resorcinol present as free monomers (by GC/LC analysis). The viscosity determined by the Brookfield viscometer showed a viscosity of 130 centipoise (cps) determined at room temperature. The reaction product of resorcinol, crotonaldehyde and formaldehyde was also analyzed by FT-IR and proton/carbon-13 NMR specroscopic methods. Analyses showed that the crotonaldehyde reacted with resorcinolic rings to produce a mixture of "1,1,2-triphenylbutanes" and "1,1,3-triphenylbutanes" structures. The resorcinol rings that have reacted with crotonaldehyde may have reacted with formaldehyde to form methylene bridged structures. All the —CHO and olefinic protons were completely reacted with resorcinol.

Average structural data from NMR is shown below:

| Structure | Number Per Resorcinol Ring |
| --- | --- |
| Resorcinolic protons | 2.74 |
| Methylene bridges | 0.72 |
| 1,1,2-Triphenylbutane links (Structure 7 in Example 3) | 0.31 |
| 1,1,3-Triphenylbutane links (Structure 8 in Example 3) | 0.23 |
| Formaldehyde/Resorcinol | 0.36 |
| Crotonaldehyde/Resorcinol | 0.18 |

EXAMPLE 6

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 40.0 grams of glutaraldehyde (50% Aqu; 0.2 mole) were added into the molten resorcinol slowly over a period of 45-60 minutes at 110-130° C. Continuously stir and hold the reaction mixture at 100-110° C. temperature for an additional 60-90 minutes to complete the resorcinol-glutaraldehyde reaction. Now, slightly lower the reaction temperature and then add 60.6 grams of an aqueous formaldehyde solution (37.6% concentration; 0.76 mole) slowly for a period of 30-45 minutes at 90-105° C. temperature or reflux conditions. The reaction mixture was held under reflux for an additional period of 30-45 minutes. After this, 161.0 grams of distilled water and about 2 grams of 50% sodium hydroxide solution were added under constant stirring to obtain an aqueous dip solution. The resin solution thus prepared had a pH=5.0, solids content of 51.2 wt. % and 8.5 wt. % resorcinol present as free monomers (by GC/LC analysis). Gel Permeation Chromatographic (GPC) analysis to determine the area ratio of select resorcinol condensation products showed the reaction components comprising about 15.4% monomer (resorcinol), 13.7% dimer, 8.6% trimer, 5.7% tetramer and 56.6% pentamer and higher. The viscosity determined by the Brookfield viscometer showed a viscosity of 120 centipoise (cps) determined at room temperature. The reaction product of resorcinol, glutaraldehyde and formaldehyde was also analyzed by FT-IR and proton/carbon-13 NMR specroscopic methods. Analyses showed that the glutaraldehyde reacted with resorcinolic rings to produce a "1,1,5,5-tetraarylsubstituted pentamethylene bridge" structures. The resorcinol rings that have reacted with glutaraldehyde may have reacted with formaldehyde to form methylene bridged structures. All the —CHO groups were completely reacted with resorcinol.

Average structural data from NMR is shown below:

| Structure | Number Per Resorcinol Ring |
| --- | --- |
| Resorcinolic protons | 2.91 |
| Methylene bridges | 0.78 |
| 1,1,5,5-Tetraarylsubstituted pentamethylene bridges (Structure 9) | 0.30 |
| Formaldehyde/Resorcinol | 0.39 |
| Glutaraldehyde/Resorcinol | 0.15 |

The final reaction product showed structures comprising the following structure.

(STRUCTURE 9)

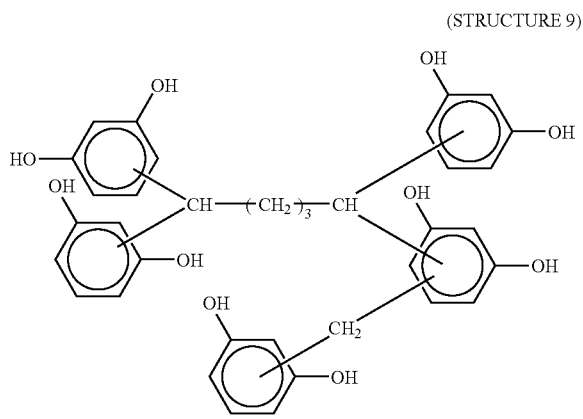

EXAMPLE 7

Into a 1-liter reaction kettle equipped with a mechanical stirrer, thermometer, reflux condenser and an addition funnel, 220.2 grams (2.0 moles) of resorcinol were charged and heated to 120° C. temperature. Then 4.0 grams of p-toluene sulfonicacid (PTSA) catalyst was added and stirred for few minutes for the complete mixing. After this, 60.0 grams of glutaraldehyde (50% Aqu; 0.3 mole) were added into the molten resorcinol slowly over a period of 45-60 minutes at 110-130° C. Continuously stir and hold the reaction mixture at 100-110° C. temperature for an additional 60-90 minutes to complete the resorcinol-glutaraldehyde reaction. Now, slightly lower the reaction temperature and then add 60.6 grams of an aqueous formaldehyde solution (37.6% concentration; 0.76 mole) slowly for a period of 30-45 minutes at 90-105° C. temperature or reflux conditions. The reaction mixture was held under reflux for an additional period of 30-45 minutes. After this, 151.0 grams of distilled water and about 4 grams of 50% sodium hydroxide solution were added under constant stirring to obtain an aqueous dip solution. The resin solution thus prepared had a pH=6.4, solids content of 52.8 wt. % and 4.9 wt. % resorcinol present as free monomers (by GC/LC analysis). The viscosity determined by the Brookfield viscometer showed a viscosity of 19,500 centipoise (cps) determined at room temperature. The reaction product of resorcinol, glutaraldehyde and formaldehyde was also analyzed by FT-IR and proton/carbon-13 NMR specroscopic methods. Analyses showed that the glutaraldehyde reacted with resorcinolic rings to produce a "1,1,5,5-tetraarylsubstituted pentamethylene bridge" structures. The resorcinol rings that have reacted with glutaraldehyde may have reacted with formaldehyde to form methylene bridged structures. All the —CHO groups were completely reacted with resorcinol.

Average structural data from NMR is shown below:

| Structure | Number Per Resorcinol Ring |
|---|---|
| Resorcinolic protons | 2.79 |
| Methylene bridges | 0.73 |
| 1,1,5,5-Tetraarylsubstituted pentamethylene bridges (As shown in Example 6) | 0.48 |
| Formaldehyde/Resorcinol | 0.37 |
| Glutaraldehyde/Resorcinol | 0.24 |

EXAMPLE 8

The flexibilized resorcinolic dip solution prepared according procedures of the above examples was tested for its performance to improve the adhesion properties of polyester tire cords. Tire cord adhesive dip formulations were prepared according to procedures outlined in Product Application Guide No. 1 published by INDSPEC Chemical Corp. for Penacolite® Resins R-50, R-2200 and R-2170 to prepare for "Single Step Dipping Systems for Tire Cord and Industrial Fabrics." Control formulation based on Penacolite® Resin R-2170 (available from INDSPEC Chemical Corp., Pittsburgh, Pa.) and formulation based on Example 1 are given below.

| ADHESIVE FORMULATIONS | | |
|---|---|---|
| COMPOSITION/INGREDIENTS | CONTROL | EXAMPLE 1 |
| Resin Solution (Weights in Grams) | | |
| 1. Water | 269.1 | 251.2 |
| 2. Sodium Hydroxide (50%) | 2.8 | 2.8 |
| 3. Penacolite ® Resin R-2170 (75%) | 25.3 | — |
| 4. Resin Solution (Example 1) | — | 40.1 |
| 5. Formaldehyde(37%) | 7.8 | 10.8 |
| Resin Solution, Total Parts | 305.0 | 305.0 |
| Latex Mix | | |
| 6. 2-Vinyl Pyridine SBR Copolymer Latex(41%) | 244.0 | 244.0 |
| 7. Water | 36.9 | 36.9 |
| Total Parts | 585.9 | 585.9 |
| Resin Solution Solids | 7.6 | 8.5 |
| Total Solids | 21.0 | 21.5 |
| Measured pH | 9.3 | 10.0 |

In the formulation dip solution preparation, the resin solution was prepared first and then the latex solution was added with good mixing to obtain the final mix solution. The final solution is aged for about 16 to about 24 hours at room temperature before using to treat the textile materials.

Tire cord made from two polyethylene terephthalate (PET) yarns of 1000 denier each (Referred to as 1000/2 cord) was used in the adhesive performance evaluations. This cord is an adhesive activated cord obtained from KOSA. These cords were dipped in the single dip adhesive formulation solutions prepared as above, dried the dipped cords under tension for 120 seconds at 170° C. temperature oven first and then cured for 60 seconds in a second oven set at 230° C. temperature. Finally the treated polyester cords were embedded in a formulated and uncured rubber and cured for H-pull adhesion test (An ASTM method D-4776) samples.

The rubber stock used to prepare the adhesion test samples was formulated based on the following composition.

| COMPOSITION | Parts (By Weight) |
|---|---|
| 1. Natural rubber | 70 |
| 2. SBR | 30 |
| 3. Carbon black (N660) | 50 |
| 4. Zinc oxide | 4 |
| 5. Stearic acid | 2 |
| 6. Naphthenic oil | 5 |
| 7. Flectol-H | 1.8 |

-continued

| COMPOSITION | Parts (By Weight) |
|---|---|
| 8. Sulfur | 2.5 |
| 9. MBTS | 0.8 |

The MDR Rheometer cure properties obtained at 160° C. temperature on the above rubber 15 compound stock are: (1) MH, dN-m=12.16; (2) ML, dN-m=0.79; (3) ts2, min=1.92; (4) t'90, min=7.90 and (5) Cure rate, dN-m=1.38.

Results obtained from the H-adhesion tests are given below.

TABLE 1

| | CONTROL R-2170 | EXAMPLE 1 |
|---|---|---|
| 1. UNAGED ADHESION (3/8" Mold, 160° C. Cure) | | |
| Adhesion, N | 67.4 | 102.8 |
| Rubber Coverage (%) | 7 | 40 |
| Energy, N-m | 0.43 | 0.62 |
| 2. UNAGED ADHESION (3/8" Mold, 170° C. Cure) | | |
| Adhesion, N | 76.2 | 108 |
| Rubber Coverage (%) | 5 | 30 |
| Energy, N-m | 0.53 | 0.62 |
| 3. HEAT AGED ADHESION (3 Days at 100° C., 3/8" Mold, 160° C. Cure) | | |
| Adhesion, N | 50.1 | 80.6 |
| Rubber Coverage (%) | 5 | 10 |
| Energy, N-m | 0.18 | 0.23 |
| 4. HUMIDITY AGED ADHESION (7 Days, 3/8" Mold, 160° C. Cure) | | |
| Adhesion, N | 54.7 | 78.7 |
| Rubber Coverage (%) | 5 | 20 |
| Energy, N-m | 0.18 | 0.22 |
| 5. UNAGED OVERCURE ADHESION (3/8" Mold, 120 Mins at 160° C. Cure) | | |
| Adhesion, N | 79.9 | 90.2 |
| Rubber Coverage (%) | 10 | 10 |
| Energy, N-m | 0.42 | 0.55 |

As demonstrated by the results on the adhesion values, the flexibilized resorcinolic dip significantly increased the unaged adhesion performance over the conventional and standard RFL dip. Higher unaged adhesion values and increased rubber coverage for the flexibilized resorcinolic dip treated polyester cords suggest more adhesive-polyester interaction. The above data indicate that an increased compatibility of the flexibilized resorcinol molecules with the polyester fibers may be responsible for the improved adhesion performance of polyester cords. Indirectly, there is evidence that the introduction of molecular flexibility in the resorcinol molecules lower the solubility parameter close to the polyester solubility parameter which ultimately improves the adhesion performance.

EXAMPLE 9

Another single step dip formulation was prepared and tested in the same manner, and with the same ingredients as those set forth herein above in Example 8, except that the flexibilized resorcinolic resin solution prepared and disclosed in Example 2 are used to evaluate its adhesive performance in polyester tire cords. Adhesive performance and the comparative data against the control resin are summarized in the following table 2.

TABLE 2

| | CONTROL R-2170 | EXAMPLE 2 | EXAMPLE 1 |
|---|---|---|---|
| 1. UNAGED ADHESION (3/8" Mold, 160° C. Cure) | | | |
| Adhesion, N | 67.4 | 94.4 | 102.8 |
| Rubber Coverage (%) | 7 | 15 | 40 |
| Energy, N-m | 0.43 | 0.68 | 0.62 |
| 2. UNAGED ADHESION (3/8" Mold, 170° C. Cure) | | | |
| Adhesion, N | 76.2 | 78.1 | 108 |
| Rubber Coverage (%) | 5 | 5 | 30 |
| Energy, N-m | 0.53 | 0.55 | 0.62 |
| 3. HEAT AGED ADHESION (3 Days at 100° C., 3/8" Mold, 160° C. Cure) | | | |
| Adhesion, N | 50.1 | 86.9 | 80.6 |
| Rubber Coverage (%) | 5 | 10 | 10 |
| Energy, N-m | 0.18 | 0.31 | 0.23 |
| 4. HUMIDITY AGED ADHESION (7 Days, 3/8" Mold, 160° C. Cure) | | | |
| Adhesion, N | 54.7 | 78.1 | 78.7 |
| Rubber Coverage (%) | 5 | 15 | 20 |
| Energy, N-m | 0.18 | 0.24 | 0.22 |

As demonstrated above, the substitution of flexibilized resorcinolic resins for the standard resorcinol-formaldehyde in the adhesive dip formulations enhances polyester adhesion to rubber. By comparing the unaged adhesion values of Example 2 to Example 1, it is evident that the Example 1 resin performed better on the rubber coverage, suggesting more polyester-adhesive interaction for the dihydroxy-2-butene based resin. Based on the structural comparison of these two resins, the Example 1 resin contained three alkylsubstituted resorcinol in the molecule compared to two in Example 2 which suggests higher reactivity for the butene based resin. One advantage of resorcinol in the RFL formulation to enhance the textile fibers adhesion is its excellent reactivity. Higher the reactivity translates into higher performance for the adhesive formulations.

While the invention has been described with respect to a limited number of embodiments, the specific features of one embodiment should not be attributed to other embodiments of the invention. No single embodiment is representative of all aspects of the inventions. In some embodiments, the compositions may include numerous compounds not mentioned herein. In other embodiments, the compositions do not include, or are substantially free of, any compounds not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A method of making a flexibilized resorcinolic resin solution, comprising:

contacting one or more phenolic compounds with approximately 0.05 to 0.4 mole, per mole of the phenolic compound, of an unsaturated aliphatic aldehyde compound in the presence of an acid catalyst to obtain a reaction mixture; and contacting the reaction mixture with about 0.1 to about 0.6 mole of an aldehyde per mole of phenolic compound to make a novolak resin, the aldehyde being different from the unsaturated aliphatic aldehyde.

2. The method of claim 1, wherein the phenolic compound is selected from m-cresol, 3,5-dimethyl phenol, resorcinol, 5-methyl resorcinol, 5- ethyl resorcinol, 5-propyl resorcinol, m-amino phenol, 2-methyl resorcinol, 4-methyl resorcinol, 4-ethyl resorcinol, 4-propyl resorcinol, phloroglucinol, or a mixture thereof.

3. The method of claim 1, wherein the phenolic compound is represented by the following formula (A):

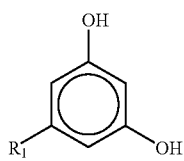

(A)

wherein $R_1$ represents a radical selected from the group consisting of hydrogen, hydroxyl and an alkyl radical having 1 to 3 carbon atoms.

4. The method of claim 1, wherein the acid catalyst is selected from oxalic acid, sulfuric acid, benzenesulfonic acid, benzenedisulfonic acid, p-toluenesulfonic acid, phosphoric acid, or a mixture thereof.

5. The method of claim 1, wherein the reaction mixture comprises at least one compound having an alkylene ether linkage.

6. The method of claim 1, wherein the contacting is carried out at a temperature in the range of between about 120° C. and about 150° C.

7. The method of claim 1, wherein the aldehyde is selected from the group consisting of formaldehyde, acetaldehyde, propionaldehyde, n-butyraldehyde, n- valeraldehyde, and a mixture thereof.

8. The method of claim 1, wherein the molar ratio of the phenolic compound to the aldehyde is between about 1:0.35 and about 1:0.45.

9. The method of claim 1, wherein the unsaturated aliphatic aldehyde is selected from crotonaldehyde, arolein, methacrolein, or a mixture thereof.

10. The method of claim 1, wherein the reaction mixture comprises a compound having the following structure:

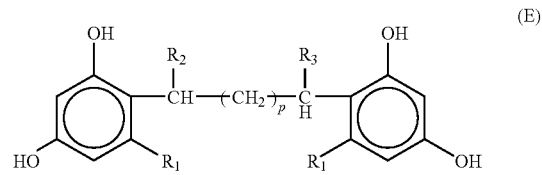

(E)

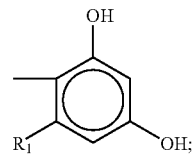

$R_3$ is $R_1$ and $R_2$ are independently —$CH_3$, —$CH_2CH_3$ or —$CH_2CH_2CH_3$; and p is 0 or 1.

11. The method of claim 1, wherein the molar ratio of the phenolic compound to the unsaturated aliphatic aldehyde is between about 1:0.1 and about 1:0.3.

* * * * *